US012795646B2

(12) United States Patent
Fakoorian et al.

(10) Patent No.: US 12,795,646 B2
(45) Date of Patent: Nov. 10, 2026

(54) CONFIGURED GRANT SIMULTANEOUS MULTI-PANEL TRANSMISSION

(71) Applicant: Apple Inc., Cupertino, CA (US)

(72) Inventors: Seyed Ali Akbar Fakoorian, San Diego, CA (US); Ankit Bhamri, Bad Nauheim (DE); Chunhai Yao, Beijing (CN); Chunxuan Ye, San Diego, CA (US); Dawei Zhang, Saratoga, CA (US); Haitong Sun, Cupertino, CA (US); Hong He, San Jose, CA (US); Oghenekome Oteri, San Diego, CA (US); Wei Zeng, Saratoga, CA (US)

(73) Assignee: Apple Inc., Cupertino, CA (US)

( * ) Notice: Subject to any disclaimer, the term of this patent is extended or adjusted under 35 U.S.C. 154(b) by 320 days.

(21) Appl. No.: 18/446,385

(22) Filed: Aug. 8, 2023

(65) Prior Publication Data

US 2024/0057069 A1 Feb. 15, 2024

Related U.S. Application Data

(60) Provisional application No. 63/396,541, filed on Aug. 9, 2022.

(51) Int. Cl.

*H04W 72/1263* (2023.01)
*H04L 5/00* (2006.01)
*H04W 72/232* (2023.01)
*H04W 76/20* (2018.01)

(52) U.S. Cl.

CPC ....... *H04W 72/1263* (2013.01); *H04L 5/0051* (2013.01); *H04W 72/232* (2023.01); *H04W 76/20* (2018.02)

(58) Field of Classification Search

CPC ........... H04W 72/1263; H04W 72/232; H04W 72/21; H04W 76/20; H04L 5/0051; H04L 5/0044; H04L 5/0048; H04B 7/0613; H04B 7/06956

See application file for complete search history.

(56) References Cited

U.S. PATENT DOCUMENTS

2020/0196265 A1* 6/2020 Ryu ...................... H04W 72/23
2021/0195616 A1* 6/2021 Venugopal ............ H04L 5/0094
2021/0243779 A1* 8/2021 Takeda .................. H04L 1/1854

FOREIGN PATENT DOCUMENTS

CA 3126029 A1 * 1/2022 ............ H04W 72/23
WO 2021090403 A1 5/2021

OTHER PUBLICATIONS

RAN1 Chair's Notes, 3GPP TSG RAN WG1 Meeting #109-e, May 9-20, 2022, 209 pages.
3rd Generation Partnership Project; Technical Specification Group Radio Access Network; NR; Multiplexing and channel coding (Release 17), 3GPP TS 38.212 V17.2.0, Jun. 2022, 201 pages.
3rd Generation Partnership Project; Technical Specification Group Radio Access Network; NR; Physical layer procedures for data (Release 17), 3GPP TS 38.214 V17.2.0, Jun. 2022, 228 pages.

(Continued)

*Primary Examiner* — Jamal Javaid

(74) *Attorney, Agent, or Firm* — Kilpatrick Townsend & Stockton LLP

(57) ABSTRACT

The present application relates to devices and components including apparatus, systems, and methods for supporting configured grant simultaneous physical uplink shared channel transmissions.

20 Claims, 10 Drawing Sheets

(56) References Cited

OTHER PUBLICATIONS

3rd Generation Partnership Project; Technical Specification Group Radio Access Network; NR; Radio Resource Control (RRC) protocol specification (Release 17), 3GPP TS 38.331 V17.1.0, Jun. 2022, 1273 pages.
International Patent Application No. PCT/US2023/029549, International Search Report and Written Opinion, Jan. 24, 2024, 17 pages.
International Patent Application No. PCT/US2023/029549, Invitation to Pay Additional Fees and, Where Applicable, Protest Fee, Nov. 23, 2023, 5 pages.
International Patent Application No. PCT/US2023/029549, International Preliminary Report on Patentability, Feb. 20, 2025, 12 pages.

* cited by examiner

CONFIGURED GRANT SIMULTANEOUS MULTI-PANEL TRANSMISSION

CROSS-REFERENCE TO RELATED APPLICATION

This application claims priority to U.S. Provisional Patent Application No. 63/396,541, filed Aug. 9, 2022, which is hereby incorporated by reference in its entirety.

FIELD

This application relates to the field of wireless networks and, in particular, to configured grant simultaneous multi-panel transmission in said networks.

BACKGROUND

Third Generation Partnership Project (3GPP) Technical Specifications (TSs) define standards for wireless networks. These TSs describe aspects related to providing multiple-input, multiple-output (MIMO) communication over a radio interface

DETAILED DESCRIPTION

Figure 1:
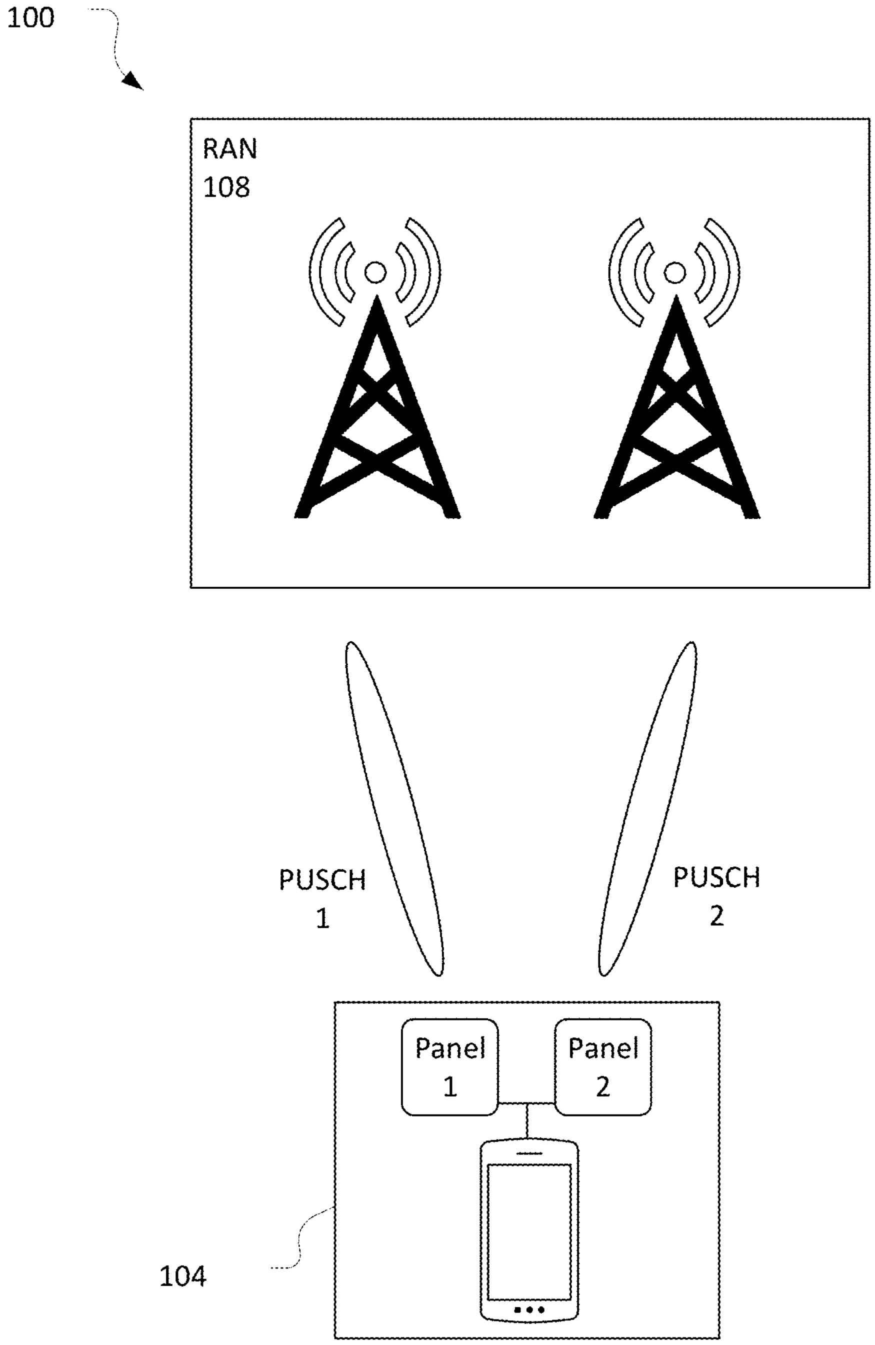
FIG. 1 illustrates a network environment in accordance with some embodiments.

The following detailed description refers to the accompanying drawings. The same reference numbers may be used in different drawings to identify the same or similar elements. In the following description, for purposes of explanation and not limitation, specific details are set forth such as particular structures, architectures, interfaces, and techniques in order to provide a thorough understanding of the various aspects of various embodiments. However, it will be apparent to those skilled in the art having the benefit of the present disclosure that the various aspects of the various embodiments may be practiced in other examples that depart from these specific details. In certain instances, descriptions of well-known devices, circuits, and methods are omitted so as not to obscure the description of the various embodiments with unnecessary detail. For the purposes of the present document, the phrases "A/B" and "A or B" mean (A), (B), or (A and B); and the phrase "based on A" means "based at least in part on A," for example, it could be "based solely on A" or it could be "based in part on A."

The following is a glossary of terms that may be used in this disclosure.

The term "circuitry" as used herein refers to, is part of, or includes hardware components that are configured to provide the described functionality. The hardware components may include an electronic circuit, a logic circuit, a processor (shared, dedicated, or group) or memory (shared, dedicated, or group), an application specific integrated circuit (ASIC), a field-programmable device (FPD) (e.g., a field-programmable gate array (FPGA), a programmable logic device (PLD), a complex PLD (CPLD), a high-capacity PLD (HCPLD), a structured ASIC, or a programmable system-on-a-chip (SoC)), or a digital signal processor (DSP). In some embodiments, the circuitry may execute one or more software or firmware programs to provide at least some of the described functionality. The term "circuitry" may also refer to a combination of one or more hardware elements (or a combination of circuits used in an electrical or electronic system) with the program code used to carry out the functionality of that program code. In these embodiments, the combination of hardware elements and program code may be referred to as a particular type of circuitry.

The term "processor circuitry" as used herein refers to, is part of, or includes circuitry capable of sequentially and automatically carrying out a sequence of arithmetic or logical operations, or recording, storing, or transferring digital data. The term "processor circuitry" may refer an application processor, baseband processor, a central processing unit (CPU), a graphics processing unit, a single-core processor, a dual-core processor, a triple-core processor, a quad-core processor, or any other device capable of executing or otherwise operating computer-executable instructions, such as program code, software modules, or functional processes.

The term "interface circuitry" as used herein refers to, is part of, or includes circuitry that enables the exchange of information between two or more components or devices. The term "interface circuitry" may refer to one or more hardware interfaces, for example, buses, I/O interfaces, peripheral component interfaces, and network interface cards.

The term "user equipment" or "UE" as used herein refers to a device with radio communication capabilities that may allow a user to access network resources in a communications network. The term "user equipment" or "UE" may be considered synonymous to, and may be referred to as, client, mobile, mobile device, mobile terminal, user terminal, mobile unit, mobile station, mobile user, subscriber, user, remote station, access agent, user agent, receiver, radio equipment, reconfigurable radio equipment, or reconfigurable mobile device. Furthermore, the term "user equipment" or "UE" may include any type of wireless/wired device or any computing device including a wireless communications interface.

The term "computer system" as used herein refers to any type interconnected electronic devices, computer devices, or components thereof. Additionally, the term "computer system" or "system" may refer to various components of a computer that are communicatively coupled with one another. Furthermore, the term "computer system" or "system" may refer to multiple computer devices or multiple computing systems that are communicatively coupled with one another and configured to share computing or networking resources.

The term "resource" as used herein refers to a physical or virtual device, a physical or virtual component within a computing environment, or a physical or virtual component within a particular device, such as computer devices, mechanical devices, memory space, processor/CPU time, processor/CPU usage, processor and accelerator loads, hardware time or usage, electrical power, input/output operations, ports or network sockets, channel/link allocation, throughput, memory usage, storage, network, database and applications, or workload units. A "hardware resource" may refer to compute, storage, or network resources provided by physical hardware elements. A "virtualized resource" may refer to compute, storage, or network resources provided by virtualization infrastructure to an application, device, or system. The term "network resource" or "communication resource" may refer to resources that are accessible by computer devices/systems via a communications network. The term "system resources" may refer to any kind of shared entities to provide services, and may include computing or network resources. System resources may be considered as a set of coherent functions, network data objects or services, accessible through a server where such system resources reside on a single host or multiple hosts and are clearly identifiable.

The term "channel" as used herein refers to any transmission medium, either tangible or intangible, which is used to communicate data or a data stream. The term "channel" may be synonymous with or equivalent to "communications channel," "data communications channel," "transmission channel," "data transmission channel," "access channel," "data access channel," "link," "data link," "carrier," "radiofrequency carrier," or any other like term denoting a pathway or medium through which data is communicated. Additionally, the term "link" as used herein refers to a connection between two devices for the purpose of transmitting and receiving information.

The terms "instantiate," "instantiation," and the like as used herein refers to the creation of an instance. An "instance" also refers to a concrete occurrence of an object, which may occur, for example, during execution of program code.

The term "connected" may mean that two or more elements, at a common communication protocol layer, have an established signaling relationship with one another over a communication channel, link, interface, or reference point.

The term "network element" as used herein refers to physical or virtualized equipment or infrastructure used to provide wired or wireless communication network services. The term "network element" may be considered synonymous to or referred to as a networked computer, networking hardware, network equipment, network node, or a virtualized network function.

The term "information element" refers to a structural element containing one or more fields. The term "field" refers to individual contents of an information element, or a data element that contains content. An information element may include one or more additional information elements.

The terms "multiple" and "plurality" are to be interpreted synonymously with one another. Both of these terms mean two or more elements as used herein.

New Radio (NR) Release 17 (R17) TSs provide that a UE can transmit multiple time-domain multiplexed (TDM) repetitions of the same transport block across different uplink (UL) beams. For NR R17 dynamic grant (DG) transmissions, the indication of the beam is provided by extending a sounding reference signal (SRS) resource indicator (SRI) bit field when two SRS resource sets with usage as 'codebook' (or two SRS resource sets with usage as 'non-Codebook') are configured. All repetitions have the same rank (for example, number of layers), although repetitions over different beams may have different antenna ports, transmit precoding matrix indicator (TPMI) (for CB-based transmission), transmit power control (TPC), etc For NR R17 CG transmissions, when two SRS resource sets are configured in srs-ResourceSetToAddModList or srs-ResourceSetToAddModListDCI-0-2, precoding information and number of layers (applicable when higher layer parameter usage in SRS-ResourceSet set to 'codebook') associated with the first and second SRS resource set is provided by precodingAndNumberOfLayers and precodingAndNumberOfLayers2, respectively, and SRS resource indicators associated with the first and second SRS resource sets are provided by srs-ResourceIndicator and srs-ResourceIndicator2, respectively.

In NR R17, simultaneous PUSCH transmission is not supported for spatial division multiplexing (SDM) or frequency division multiplexing (FDM).

Simultaneous multi-panel UL transmissions are the subject of studies in NR Release 18 (R18).

Some considerations may be with respect to UL precoding indication for PUSCH for single downlink control information (DCI) and multi-DCI based multi-transmit-receive point (TRP) operation. Current R18 TSs envision single DCI and multi-DCI based multi-TRP operation having a total of up to four layers across all antenna panels and a total of up to two codewords across all antenna panels.

Some considerations may be with respect to UL beam indication for physical uplink control channel (PUCCH)/physical uplink shared channel (PUSCH) for single DCI and multi-DCI based multi-TRP operation. For the case of multi-DCI based multi-TRP operation, only PUSCH plus PUSCH, or PUCCH plus PUCCH is transmitted across two panels in a same component carrier (CC).

For multi-DCI based simultaneous transmission across multiple panels (STxMP), PUSCH plus PUSCH transmission may be further considered. Some aspects for consideration may include two PUSCHs being associated with different TRPs and transmitted from different UE panels. The total number of layers of these two PUSCHs may be up to 4.

STxMP of PUSCH+PUSCH transmission in which there is some combination of DG-PUSCH, CG-PUSCH, and msg3/msgA PUSCH may also be considered.

Further, the overlapping type(s) of fully/partially in time domain and fully/partially/non-overlapping in frequency domain may be studied and justified for PUSCH+PUSCH.

Embodiments of the present disclosure address various issues related to PUSCH STxMP when the uplink transmissions are both CG transmissions (for example, CG+CG) or are CG and DG transmissions (for example, CG+DG).

A first aspect of the disclosure relates to a CG configuration for STxMP within a single CG configuration. Embodiments describe STxMP scheme indication, resource allocation, beam indication, etc.

A second aspect of the disclosure relates to simultaneous transmission of different CG configurations over different panels. Embodiments describe indication of STxMP versus single-panel transmission, beam association, etc.

A third aspect of the disclosure relates to CG+DG simultaneous transmission over different panels. Embodiments describe the conditions based on which simultaneous transmission is allowed, subject to UE capability. For example, these conditions may be associated with different priorities (for example, DG is low priority PUSCH but CG is high priority) or timeline requirements (for example, the timeline requirement for CG overriding (for the same or different hybrid automatic repeat request (HARQ) process identifiers (IDs) between CG and DG) may be relaxed).

FIG. 1 illustrates a network environment 100 in accordance with some embodiments. The network environment 100 may include a user equipment 104 and a radio access network (RAN) 108. In some embodiments, the RAN 108 may have one or more base stations or TRPs that provide one or more wireless access cells through which the UE 104 may communicate with a cellular network.

The UE 104 and the RAN 108 may communicate over air interfaces compatible with 5G NR or later system standards as provided by 3GPP TSs. If the RAN 108 is a 5G RAN, the base stations may also be referred to as gNBs.

The UE 104 may include a plurality of antenna panels with each antenna panel having an array of antenna elements. As shown, the UE 104 has two antenna panels, antenna panel 1 and antenna panel 2. The UE 104 may use antenna panel 1 and antenna panel 2 to simultaneously transmit uplink signals. As shown, the UE 104 transmits PUSCH 1 from antenna panel 1 and transmits PUSCH 2 from antenna panel 2. PUSCH 1 may be scheduled based on CG configuration, and PUSCH 2 may be scheduled based on a CG configuration or a DG as will be described herein.

Figure 2:
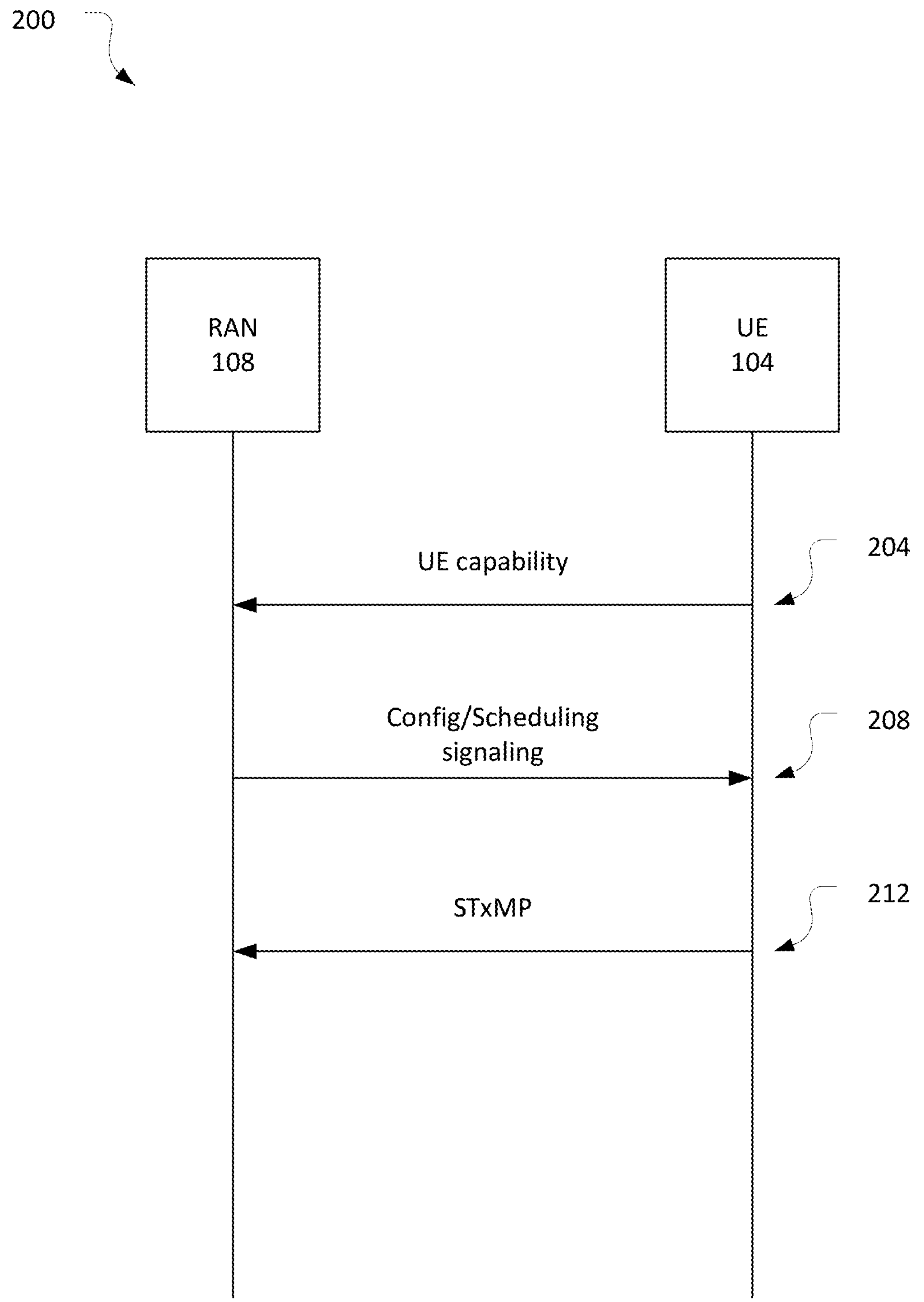
FIG. 2 illustrates a signaling diagram in accordance with some embodiments.

FIG. 2 illustrates a signaling diagram 200 in accordance some embodiments of the present disclosure. The signaling diagram 200 illustrate signals transmitted between the RAN 108 and the UE 104.

At 204, the UE 104 may provide UE capability information. The UE capability information may be provided in one or more messages at various times. In some embodiments, the UE capability information may be proactively provided by the UE 104. In other embodiments, the UE capability information may be provided by the UE 104 at the request of the RAN 108. The UE capability information may provide an indication of which STxMP schemes are supported by the UE, and may further provide ancillary information with respect to the supported STxMP operation. Further details of the UE capability information will be provided elsewhere herein.

At 208, the RAN 108 may transmit configuration and scheduling information to the UE 104. The configuration and scheduling information may schedule CG+CG or CG+DG STxMP PUSCH transmissions consistent with the UE capability information provided at 204. The configuration and scheduling signaling may represent one or more messages at different protocol layers, for example, at the RRC layer or the PHY layer (for example, DCI).

A PUSCH transmission scheduled by DG may be scheduled by scheduling DCI in a physical downlink control channel (PDCCH) that provides a specific resource allocation for the PUSCH transmission. A PUSCH transmission scheduled by CG may be scheduled based on a Type-1 UL CG configuration or a Type-2 UL CG configuration. A Type-1 UL CG configuration may be provided through RRC signaling as a configured grant configuration (ConfiguredGrantConfig) information element (IE) that provides uplink resources (for example, a set of resource blocks) that may be used for the PUSCH transmission. Once the Type-1 UL CG configuration provides the indication of the uplink resources, no further signaling is needed and the UE 104 may perform the PUSCH transmission in the designated resources. A Type-2 UL CG configuration may utilize RRC signaling to provide information of uplink resources. Subsequently, an activation DCI may be transmitted to activate the resources for the PUSCH transmission. The activation DCI may also provide additional information about the CG configuration such as, for example, time-domain resource allocation (TDRA), frequency-domain resource allocation (FDRA), etc.

Upon receiving the configuration/scheduling signaling at 208, the UE 104 may transmit the PUSCH transmissions using STxMP at 212.

Further details with respect to various of these phases of the signaling diagram 200 are described herein.

In the first aspect of the disclosure, a single CG configuration may be used for the STxMP.

With the first aspect, the UE capability information transmitted at 204 may indicate that the UE 104 is capable of performing simultaneous transmission of a single CG PUSCH transmission across different panels.

Separate consideration for Type-1 and Type-2 UL CG configuration may be given for operations of the first aspect.

For Type-1 UL CG configuration, the UE 104 may be provided an indication of an STxMP scheme that will be used as part of CG configuration. This indication may be provided in the configuration/scheduling signaling at 208. The STxMP scheme may be an FDM-A scheme, an FDM-B scheme, an SDM scheme, or a single-frequency network (SFN) scheme.

Figure 3:
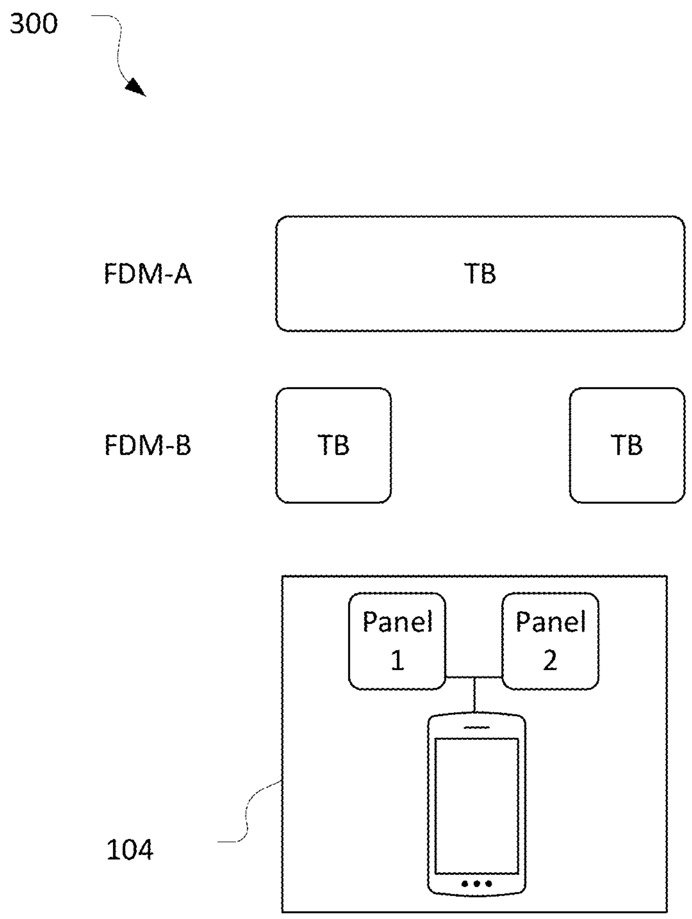
FIG. 3 illustrates frequency division multiplexing schemes in accordance with some embodiments.

FIG. 3 illustrates FDA schemes 300 in accordance with some embodiments. In FDM-A scheme, a single transport block (TB) may be jointly transmitted from both antenna panel 1 and antenna panel 2. For example, the UE 104 may jointly encode the TB on resource elements associated with both antenna panel 1 and antenna panel 2, with only one rate matching being performed.

In FDM-B scheme, a single TB may be independently transmitted from each antenna panel. For example, the UE 104 may encode the TB on resource elements associated with antenna panel 1 and perform rate matching based on those resource elements. The UE 104 may separately encode the TB on resource elements associated with antenna panel 2 and perform rate matching based on those resource elements.

In SDM, the UE 104 may use the same time and frequency resources for transmissions from each antenna panel. Different layers of a transport block may be associated with different panels. For example, if a simultaneous PUSCH transmission is scheduled over four layers, the first two layers may be transmitted by antenna panel 1 and the second two layers to be transmitted by antenna panel 2. In other embodiments, an SDM scheme may include transmission of different repetitions of a single transport block using different panels.

In SDM, even though the same transport block may be transmitted by different antenna panels, different coded bits may be transmitted due to, for example, different redundancy versions, rate matching, etc. SFN may be considered a special case of SDM in which the exact same coded bits are transmitted by the different antenna panels.

The indication of the STxMP scheme for Type-1 UL CG configuration may be included in an RRC parameter (for example, an STxMP scheme field) added to the ConfiguredGrantConfig IE, for example. The RRC parameter may defined per CG configuration and may provide an indication of the STxMP scheme associated with the CG configuration. If the STxMP scheme field is not defined for a particular Type-1 CG configuration, the CG configuration may be for a regular single panel transmission.

In some embodiments, if the indicated STxMP scheme is an FDM-A or FDM-B schemes, the UE 104 may be provided with an additional indication about the resource splitting across different panels as part of CG configuration. For example, a CG configuration may provide an FDRA to indicate resources associated with antenna panel 1 and may further provide an RRC offset. The RRC offset may be defined per CG and may indicate a modular of a same resource block allocation associated with antenna panel 2. In another example, the FDRA in the CG configuration may indicate a set of resources. A first subset of the set of resources may be associated with antenna panel 1 and a second subset of the set of resources may be associated with antenna panel 2. In other embodiments, the resource splitting may be indicated in other ways. For example, in some embodiments the indication of resource splitting may be aligned with a procedure used for DG transmissions.

The indication of the STxMP scheme (and resource splitting indication for FDM-A and FDM-B) for Type-2 UL CG configuration may be included as part of the CG configuration, similar to that described above with respect to the Type-1 CG configuration. Some embodiments may additionally/alternatively provide the STxMP scheme/resource splitting indications in the activation DCI, or in a combination of the CG configuration and the activation DCI.

In the second aspect of the disclosure, different CG configurations may be used for STxMP.

With the second aspect, the UE capability information transmitted at 204 may indicate that the UE 104 is capable of simultaneous transmission of two CG PUSCH transmissions across different antenna panels.

Separate consideration for Type-1 and Type-2 UL CG configuration may be given for operations of the second aspect.

For Type-1 UL CG configuration, the UE 104 may be provided an indication about STxMP according to one of the following options.

In a first option, if the UE 104 is provided two CG configurations associated with different SRS resource sets, and the two CG configurations schedule PUSCH transmissions that overlap in time, the UE 104 may determine that STxMP is expected and may transmit both CG PUSCHs simultaneously (subject to UE capability). The associations of the CG configurations to the SRS resource sets may be provided by a first CG configuration (for example, CG config1) having a first SRI (for example, srs-ResourceIndicator) and a second CG configuration (for example, CG config2) having a second SRI (for example, srs-ResourceIndicator2).

In a second option, a new RRC parameter may be defined. The new RRC parameter may be, for example, a pool index (poolIndx) that has a value of '0' or '1.' If the UE 104 is configured with two SRS resource sets, the two CG configurations are associated with different poolIndx values, and the two CG PUSCHs overlap in time, the UE 104 may determine that STxMP is expected and may transmit both CG PUSCHs simultaneously (subject to UE capability). In some embodiments, the indication may be further based on the two CG configurations being associated with different SRIs as discussed above with respect to the first option.

In some embodiments, the UE 104 may be provided an indication about STxMP for a Type-2 UL CG configuration in a manner similar to that discussed above for the Type-1 UL CG configuration.

In other embodiments, for the Type-2 UL CG configuration, the STxMP indication may be provided based on the activating DCIs used for the different CG PUSCH transmissions. For example, the indication may be based on the first activating DCI, corresponding to a first UL CG configuration, being received in a control resource set (CORESET) having a first pool index, and a second activating DCI, corresponding to a second UL CG configuration, being received in a CORESET having a second pool index. In some embodiments, the indication may be further based on the two CG configurations being associated with different SRIs as discussed above.

A third aspect of the disclosure relates to simultaneous transmissions of PUSCH transmissions scheduled by CG and DG.

Clause 6.1 of 3GPP TS 38.214 v17.2.0 (2022-06-23) describes that a DG PUSCH transmission will override a CG PUSCH transmission assuming a cancellation timeline is met.

> A UE is not expected to be scheduled by a PDCCH ending in symbol i to transmit a PUSCH on a given serving cell overlapping in time with a transmission occasion, where the UE is allowed to transmit a PUSCH with configured grant according to [10, TS38.321], starting in a symbol j on the same serving cell if the end of symbol i is not at least N_2 symbols before the beginning of symbol j. The value N_2 in symbols is determined according to the UE processing capability defined in Clause 6.4, and N_2 and the symbol duration are based on the minimum of the subcarrier spacing corresponding to the PUSCH with configured grant and the subcarrier spacing of the PDCCH scheduling the PUSCH . . . .
>
> A UE is not expected to be scheduled by a PDCCH ending in symbol i to transmit a PUSCH on a given serving cell for a given HARQ process, if there is a transmission occasion where the UE is allowed to transmit a PUSCH with configured grant according to [10, TS38.321 [v17.1.0 (2022-07-20)]] with the same HARQ process on the same serving cell starting in a symbol j after symbol i, and if the gap between the end of PDCCH and the beginning of symbol j is less than N 2 symbols. The value N_2 in symbols is determined according to the UE processing capability defined in clause 6.4, and N_2 and the symbol duration are based on the minimum of the subcarrier spacing corresponding to the PUSCH with configured grant and the subcarrier spacing of the PDCCH scheduling the PUSCH.

TS 38.214, Clause 6.1, pages 134-135.

In the third aspect of the disclosure, the UE 104 may be indicated about simultaneous transmission of CG+DG. The third aspect may have two options.

In a first option of the third aspect, the UE 104 may be implicitly indicated about simultaneous transmission of CG+DG based on timeline conditions or priorities.

For example, the UE 104 may interpret the timeline conditions to override the CG PUSCH not being met by the DG PUSCH to be an implicit indication that PUSCH transmissions scheduled by CG and DG are to be simultaneously transmitted.

Figure 4:
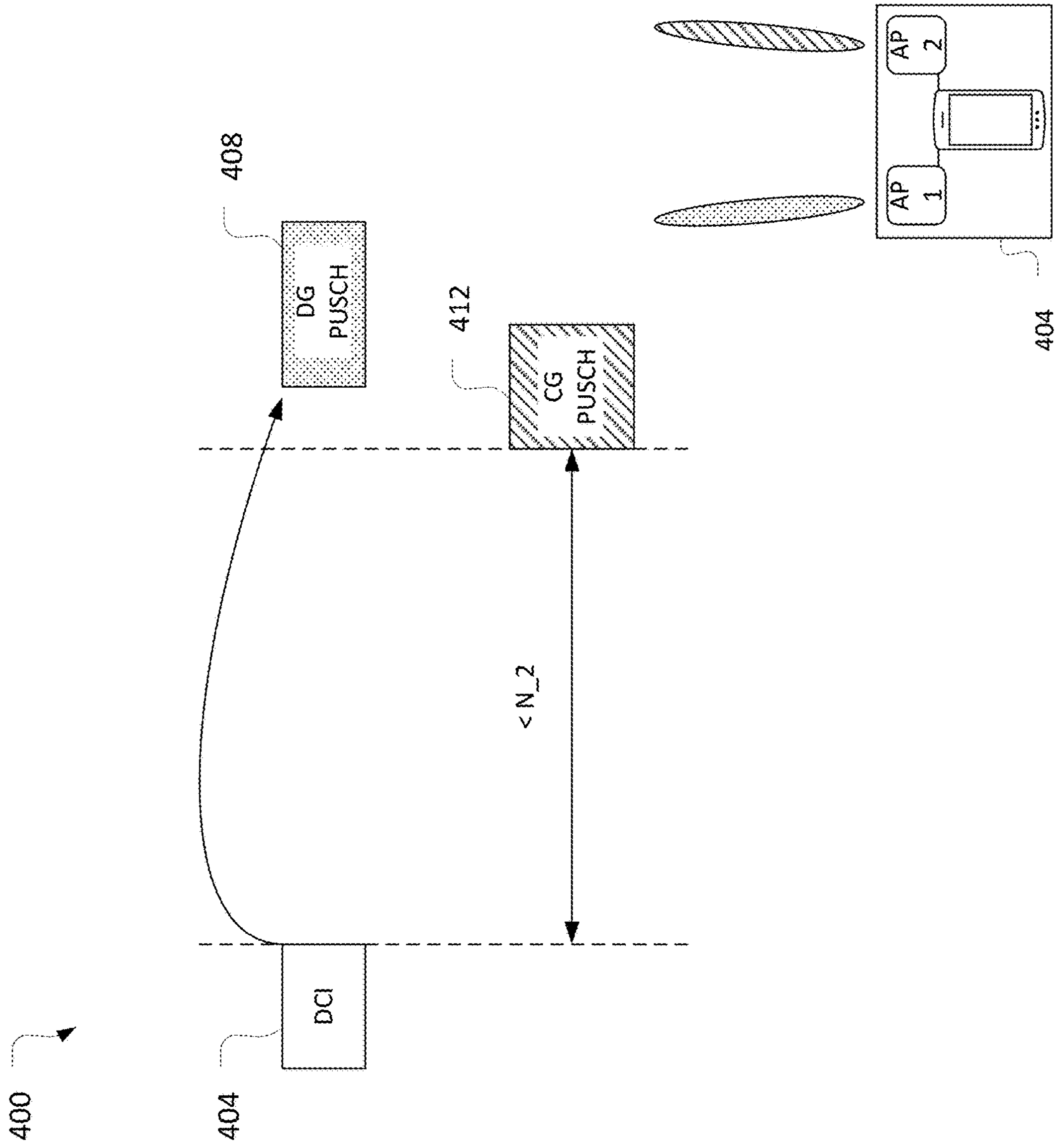
FIG. 4 illustrates a scheduling scenario in accordance with some embodiments.

FIG. 4 illustrates scheduling scenario 400 in accordance with some embodiments. The scheduling scenario 400 may include DCI 404 that schedules a DG PUSCH 408 to be transmitted from antenna panel (AP) 1. The scheduling scenario 400 also shows a CG PUSCH 412 that is to be transmitted from antenna panel (AP) 2. The CG PUSCH 412 partially overlaps the DG PUSCH 408 in the time domain.

In the scheduling scenario 400, the time between the last symbol on which the DCI 404 is transmitted and the first symbol of the CG PUSCH 412 is less than a predetermined N_2 value, which may be based on UE processing capability as described in clause 6.1 of TS 38.214. Thus, the timeline condition required for the DG PUSCH 408 to override the CG PUSCH 412 is not met. In this case, the UE 104 may not have enough time to cancel the CG PUSCH 412. Thus, subject to UE capability, the UE 104 may simultaneously transmit both the CG PUSCH 412 and the DG PUSCH 408 from respective antenna panels. A receiver will then try to decode the DG and CG grants.

In some instances, both the DG PUSCH and the CG PUSCH may be associated with the same panel. For example, both may be associated with the same SRS resource set. This may be considered an error case and a scheduler in the base station may ensure this situation does not happen. Alternatively, if this case should arise, the UE 104 may transmit the CG PUSCH from the other antenna panel. For example, if both the DG PUSCH and the CG PUSCH are associated with antenna panel 1, the CG PUSCH assignment in this instance may be overridden and the UE 104 may transmit the CG PUSCH from antenna panel 2.

In some embodiments, the UE 104 is implicitly indicated about simultaneous transmission of CG+DG based on the DG and CG PUSCH transmissions carrying different data priorities. In some embodiments, this may be triggered when the CG PUSCH has a relatively higher priority than the DG PUSCH. This may happen if, for example, the UE 104 transmits enhanced mobile broadband (eMBB) data in the DG PUSCH and transmits ultra-reliable low-latency communication (URLLC) data in the CG PUSCH.

In the event the DG and CG PUSCH transmissions carry different data priorities, the UE 104 may simultaneously transmit both CG and DG from different panels even if the timeline to cancel the CG PUSCH is met, subject to UE capability. In this instance, the receiver(s) will attempt to decode both DG and CG grants.

In a second option of the third aspect, the UE 104 may be explicitly indicated about simultaneous transmission of CG+DG.

If the UE 104 is configured with two SRS resource sets, the explicit indication may be accomplished by associating the CG and DG with different SRS resource sets. For example, an SRS resource set indicator in the DG may indicate it is associated with a first SRS resource set, (e.g., srs-ResourceIndicator), while a Type-1 CG is configured with an indication that it is associated with a second SRS resource set (e.g., srs-ResourceIndicator2). For Type-2 CG, the SRI indication may follow in the activation DCI and it may indicate an association to a SRS resource set different from SRS resource set indicated by DCI corresponding to DG PUSCH.

In some embodiments, in which the CG is Type-2, the explicit indication may be accomplished by having the activation DCI and the DCI associated with the DG PUSCH being within CORESETs having different coreset pool indexes.

The ability to simultaneously transmit PUSCH transmissions based on single CG with SDM, CG+CG, or CG+DG may involve a number of different features. Capabilities with respect to various of these features may be provided in the UE capability information signaled at 204 in accordance with some embodiments. Some specific capabilities are discussed as follows.

In some embodiments, the UE capability information may include capabilities related to the ability to perform STxMP for transmissions that fully overlap in the time domain or only partially overlap in the time domain. For example, it may require more processing capabilities of the UE 104 to perform an STxMP when transmissions only partially overlap in the time domain (such as DG PUSCH 408 and CG PUSCH 412 of FIG. 4) than if they fully overlap. Thus, some embodiments may include an indication of whether the symbol allocation corresponding to the PUSCH transmissions, which may be based on start and length indicators (SLIVs), need to be partially aligned or fully aligned.

In some embodiments, the UE capability information may include capabilities related to the ability to perform STxMP for transmissions that that have demodulation reference symbol (DMRS) types and symbol locations that are not aligned, partially aligned, or fully aligned. The DMRS types may be PUSCH mapping type A in which the DMRS symbol starts at symbol 2 or symbol 3 regardless of PUSCH start and length, or PUSCH mapping type B in which the DMRS symbol can start at the first PUSCH symbol regardless of where the PUSCH starts.

In some embodiments, the UE capability information may include capabilities related to the ability to perform STxMP for transmissions that that have DMRS ports belonging to the same or orthogonal code-division multiplexing (CDM) groups.

Figure 5:
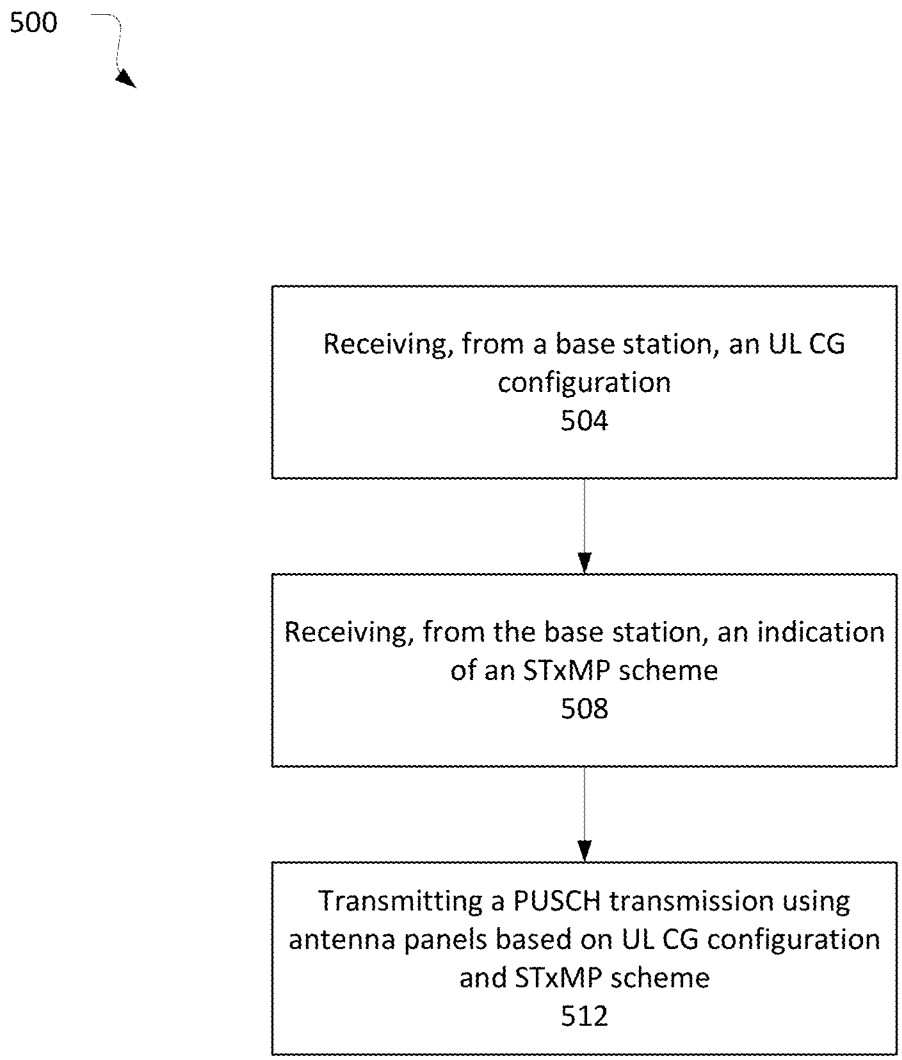
FIG. 5 illustrates an operational flow/algorithmic structure in accordance with some embodiments.

FIG. 5 includes an operation flow/algorithmic structure 500 in accordance with some embodiments. The operation flow/algorithmic structure 500 may be performed or implemented by a device such as, for example, UE 104 or UE 900; or components thereof, for example, processors 904.

The operation flow/algorithmic structure 500 may include, at 504, receiving a UL CG configuration. The UL CG configuration may be a ConfiguredGrantConfig IE received in an RRC message. The UL CG configuration may be for a Type-1 or a Type-2 UL CG.

The operation flow/algorithmic structure 500 may further include, at 508, an indication of an STxMP scheme. In some embodiments, the indication may be received as part of the UL CG configuration. For example, the ConfiguredGrant-Config IE may include an STxMP indication field that may be set to indicate a particular STxMP scheme to use for the PUSCH. In embodiments in which the UL CG is a Type-2 CG, the indication may be received in the UL CG configuration, the activating DCI, or a combination of both. For one example, the RRC message with the UL CG configuration may define a plurality of STxMP schemes, and the activation DCI may select one of the configured plurality of STxMP schemes to be used with the UL CG triggered by the activation DCI.

In various embodiments, the STxMP scheme may be an FDM-A scheme, an FDM-B scheme, an SDM scheme, or an SFN scheme. In the event the STxMP scheme is an FDM scheme, the UL CG configuration may also provide an indication of how the frequency resources are split among the antenna panels. For example, the UL CG configuration may include an FDRA field to indicate a set of resources associated with the first antenna panel and may further include an offset to be used with respect to the first set of resources to identify a second set of resources associated with a second antenna panel. For another example, the FDRA field may indicate a set of resources, with a first subset of the resources being associated with the first antenna panel and a second subset of the resources being associated with the second antenna panel.

The operation flow/algorithmic structure 500 may further include, at 512, transmitting a PUSCH transmission using a plurality of antenna panels of the UE. The transmission may be based on the UL CG configuration and the indicated STxMP scheme.

Figure 6:
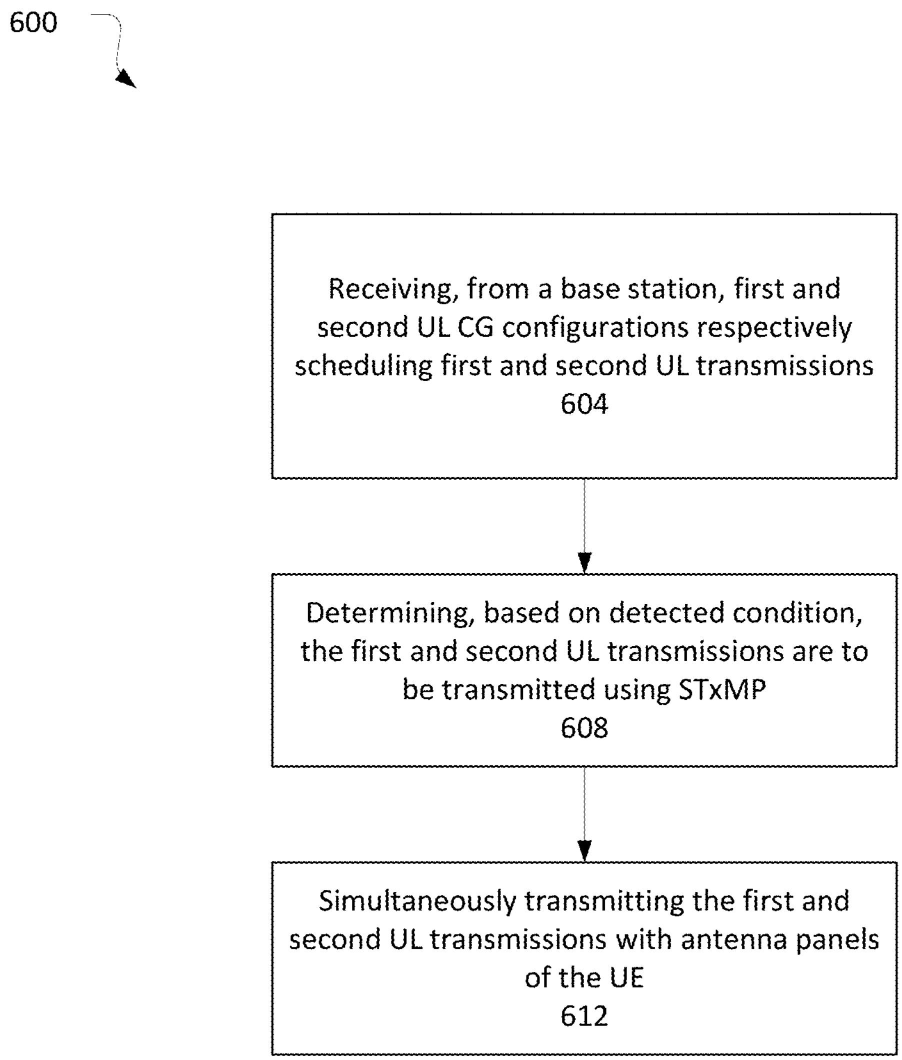
FIG. 6 illustrates another operational flow/algorithmic structure in accordance with some embodiments.

FIG. 6 includes an operation flow/algorithmic structure 600 in accordance with some embodiments. The operation flow/algorithmic structure 600 may be performed or implemented by a device such as, for example, UE 104 or UE 900; or components thereof, for example, processors 904.

The operation flow/algorithmic structure 600 may include, at 604, receiving first and second UL CG configurations. The first UL CG configuration may schedule a first UL transmission and the second UL CG configuration may schedule a second UL transmission.

The operation flow/algorithmic structure 600 may further include, at 608, determining that the first and second UL transmissions are to be transmitted using STxMP. This determination may be based on detecting a condition. In some embodiments, the condition may be based on the first and second UL CG configurations being associated with different SRS resource sets or pool indexes. If the UL CG configurations are type-2 UL CG configurations, the trigger condition may be that the activation DCIs are received in CORESETs that are associated with different pool indexes.

The operation flow/algorithmic structure 600 may further include, at 612, simultaneously transmitting the first and second UL transmissions with a plurality of antenna panels of the UE.

Figure 7:
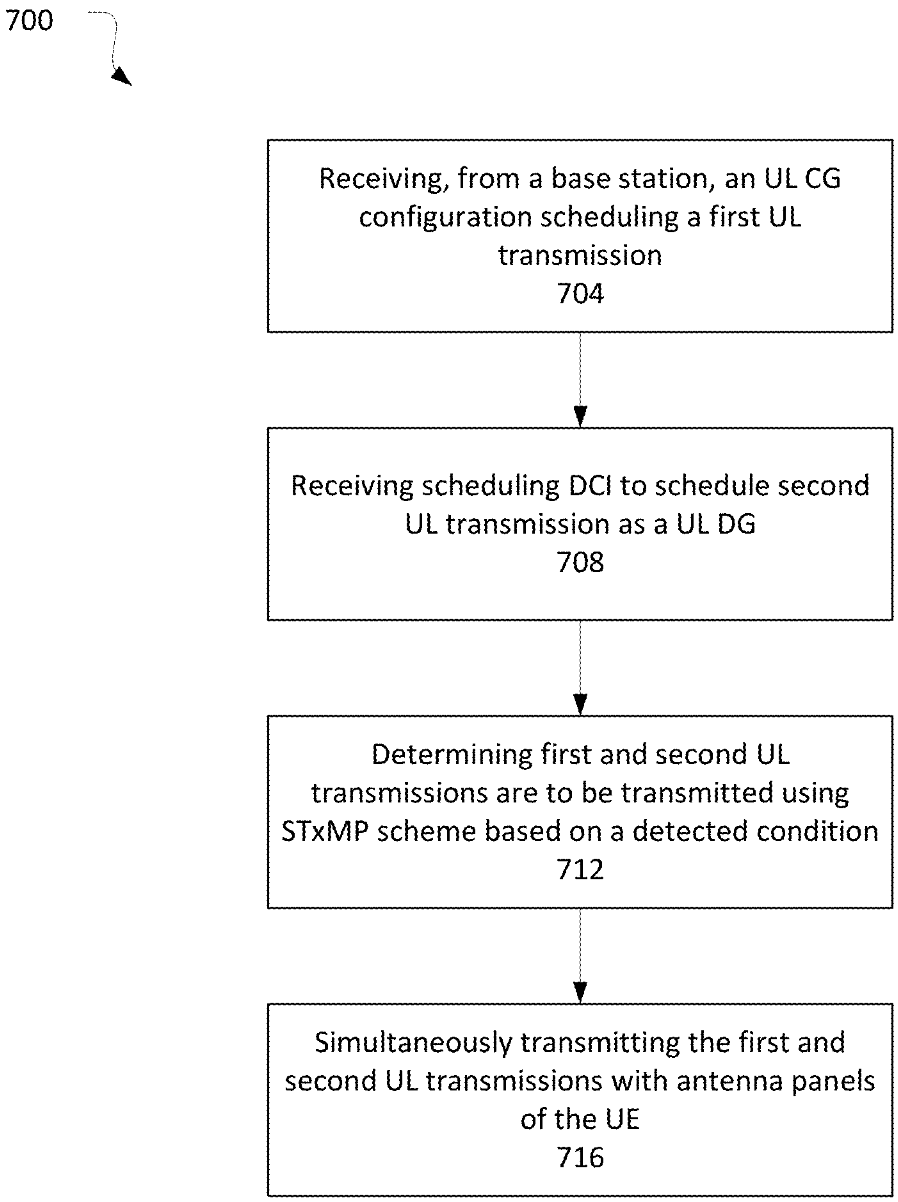
FIG. 7 illustrates another operational flow/algorithmic structure in accordance with some embodiments.

FIG. 7 includes an operation flow/algorithmic structure 700 in accordance with some embodiments. The operation flow/algorithmic structure 700 may be performed or implemented by a device such as, for example, UE 104 or UE 900; or components thereof, for example, processors 904.

The operation flow/algorithmic structure 700 may include, at 704, receiving a UL CG configuration scheduling a first UL transmission. The UL CG configuration may be a Type-1 UL CG configuration or a Type-2 UL CG configuration.

The operation flow/algorithmic structure 700 may further include, at 708, receiving scheduling DCI to schedule a second UL transmission as a UL DG.

The operation flow/algorithmic structure 700 may further include, at 712, determining first and second UL transmissions are to be transmitted using an STxMP scheme. This determination may be based on a detected condition.

In some embodiments, the detected condition may be based on a time between receiving the scheduling DCI and the resource upon which the UC CG PUSCH is scheduled. For example, the condition may be detected if the time is less than a predetermined threshold. The predetermined threshold may be the N_2 value based on UE processing capability.

In some embodiments, if the UL CG configuration and the UL DG are both associated with the same SRS resource set, the UE may use the SRS resource set for the UL DG and use a different SRS resource set for the UL CG configuration. For example, if the signaled SRS resource set corresponds to antenna panel 1, the UE may transmit the DG PUSCH using antenna panel 1 and may transmit the CG PUSCH using antenna panel 2.

In some embodiments, the detected condition may be based on priorities associated with the uplink transmissions. For example, the condition may be detected when the CG PUSCH transmission is to carry data associated with a relatively higher priority than data carried by the DG PUSCH transmission.

Additionally/alternatively, the condition may be detected when the UL CG configuration and the UL DG are associated with different SRS resource sets or pool indexes. If the UL CG configuration is a Type-2 CG, the condition may be detected if the scheduling DCI is in a CORESET associated with a first pool index and the activation DCI is in a CORESET associated with a second pool index.

The operation flow/algorithmic structure 700 may further include, at 716, simultaneously transmitting the first and second UL transmissions with a plurality of antenna panels of the UE.

Figure 8:
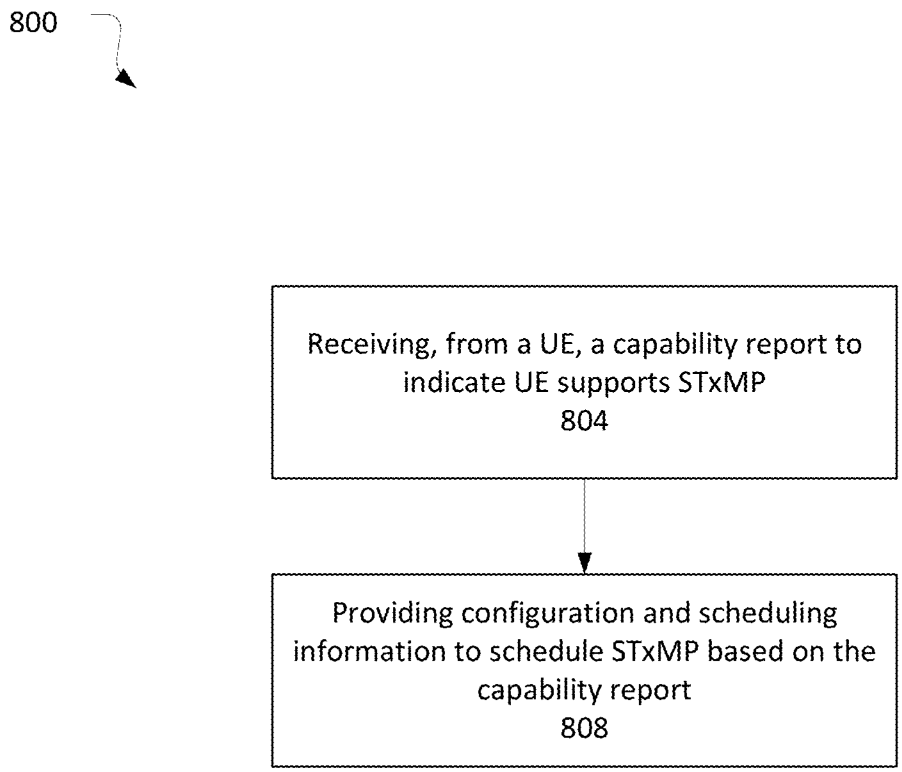
FIG. 8 illustrates another operational flow/algorithmic structure in accordance with some embodiments.

FIG. 8 includes an operation flow/algorithmic structure 800 in accordance with some embodiments. The operation flow/algorithmic structure 800 may be performed or implemented by a device such as, for example, a base station of the RAN 108 or base station 1000; or components thereof, for example, processors 1004.

The operation flow/algorithmic structure 800 may include, at 804, receiving a capability report to indicate a UE supports STxMP. The capability report may indicate that the UE supports STxMP for multiple CG transmissions from a single CG configuration, multiple CG transmissions from multiple CG configurations, or a CG transmission and a DG transmission.

The capability report may include a number of additional features that may be relevant to STxMP. For example, the capability report may indicate whether the UE supports STxMP for multiple transmissions having fully aligned symbols or partially aligned symbols. Additionally/alternatively, the capability report may indicate whether the UE supports STxMP for multiple transmissions having non-, partially-, or fully-aligned DMRS symbol locations and types. Additionally/alternatively, the capability report may indicate whether the UE supports STxMP for multiple transmissions having DMRS ports belonging to a same CDM group or to orthogonal CDM groups.

The operation flow/algorithmic structure 800 may further include, at 808, providing configuration and scheduling information to schedule a STxMP based on the capability report. The configuration/scheduling information may be provided in various RRC/DCI messages as discussed herein.

Figure 9:
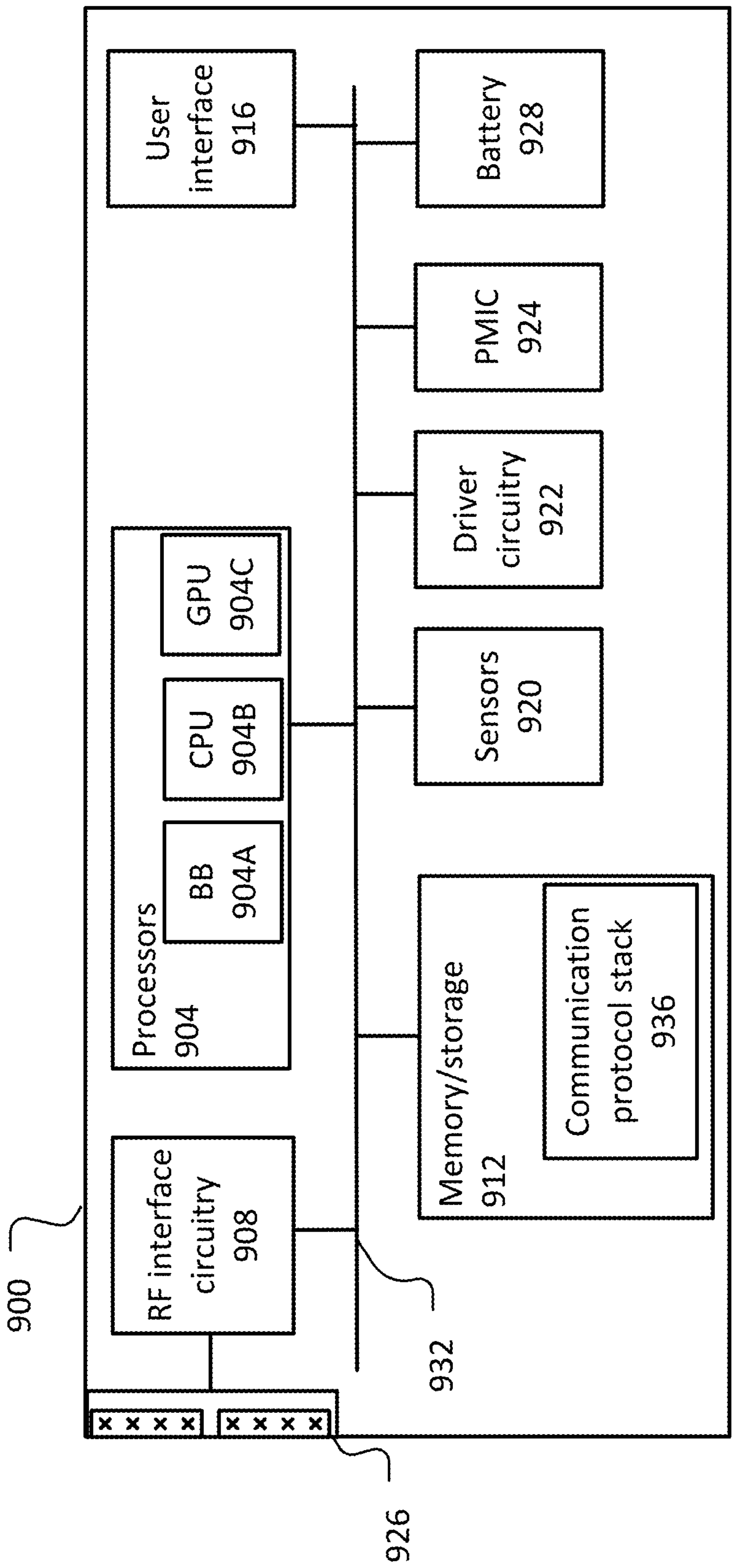
FIG. 9 illustrates a user equipment in accordance with some embodiments.

FIG. 9 illustrates an example UE 900 in accordance with some embodiments. The UE 900 may be any mobile or non-mobile computing device, such as, for example, a mobile phone, a computer, a tablet, an industrial wireless sensor (for example, a microphone, a carbon dioxide sensor, a pressure sensor, a humidity sensor, a thermometer, a motion sensor, an accelerometer, a laser scanner, a fluid level sensor, an inventory sensor, an electric voltage/current meter, or an actuators), a video surveillance/monitoring device (for example, a camera), a wearable device (for example, a smart watch), or an Internet-of-things (IoT) device.

The UE 900 may include processors 904, RF interface circuitry 908, memory/storage 912, user interface 916, sensors 920, driver circuitry 922, power management integrated circuit (PMIC) 924, antenna structure 926, and battery 928. The components of the UE 900 may be implemented as integrated circuits (ICs), portions thereof, discrete electronic devices, or other modules, logic, hardware, software, firmware, or a combination thereof. The block diagram of FIG. 9 is intended to show a high-level view of some of the components of the UE 900. However, some of the components shown may be omitted, additional components may be present, and different arrangement of the components shown may occur in other implementations.

The components of the UE 900 may be coupled with various other components over one or more interconnects 932, which may represent any type of interface, input/output, bus (local, system, or expansion), transmission line, trace, optical connection, etc. that allows various circuit components (on common or different chips or chipsets) to interact with one another.

The processors 904 may include processor circuitry such as, for example, baseband processor circuitry (BB) 904A, central processor unit circuitry (CPU) 904B, and graphics processor unit circuitry (GPU) 904C. The processors 904 may include any type of circuitry or processor circuitry that executes or otherwise operates computer-executable instructions, such as program code, software modules, or functional processes from memory/storage 912 to cause the UE 900 to perform operations as described herein.

In some embodiments, the baseband processor circuitry 904A may access a communication protocol stack 936 in the memory/storage 912 to communicate over a 3GPP compatible network. In general, the baseband processor circuitry 904A may access the communication protocol stack to: perform user plane functions at a PHY layer, MAC layer, RLC layer, PDCP layer, SDAP layer, and PDU layer; and perform control plane functions at a PHY layer, MAC layer, RLC layer, PDCP layer, RRC layer, and a non-access stratum layer. In some embodiments, the PHY layer operations may additionally/alternatively be performed by the components of the RF interface circuitry 908.

The baseband processor circuitry 904A may generate or process baseband signals or waveforms that carry information in 3GPP-compatible networks. In some embodiments, the waveforms for NR may be based cyclic prefix OFDM (CP-OFDM) in the uplink or downlink, and discrete Fourier transform spread OFDM (DFT-S-OFDM) in the uplink.

The memory/storage 912 may include one or more non-transitory, computer-readable media that includes instructions (for example, communication protocol stack 936) that may be executed by one or more of the processors 904 to cause the UE 900 to perform various operations described herein. The memory/storage 912 include any type of volatile or non-volatile memory that may be distributed throughout the UE 900. In some embodiments, some of the memory/storage 912 may be located on the processors 904 themselves (for example, L1 and L2 cache), while other memory/storage 912 is external to the processors 904 but accessible thereto via a memory interface. The memory/storage 912 may include any suitable volatile or non-volatile memory such as, but not limited to, dynamic random access memory (DRAM), static random access memory (SRAM), erasable programmable read only memory (EPROM), electrically erasable programmable read only memory (EEPROM), Flash memory, solid-state memory, or any other type of memory device technology.

The RF interface circuitry 908 may include transceiver circuitry and radio frequency front module (RFEM) that allows the UE 900 to communicate with other devices over a radio access network. The RF interface circuitry 908 may include various elements arranged in transmit or receive paths. These elements may include, for example, switches, mixers, amplifiers, filters, synthesizer circuitry, control circuitry, etc.

In the receive path, the RFEM may receive a radiated signal from an air interface via antenna structure 926 and proceed to filter and amplify (with a low-noise amplifier) the signal. The signal may be provided to a receiver of the transceiver that down-converts the RF signal into a baseband signal that is provided to the baseband processor of the processors 904.

In the transmit path, the transmitter of the transceiver up-converts the baseband signal received from the baseband processor and provides the RF signal to the RFEM. The RFEM may amplify the RF signal through a power amplifier prior to the signal being radiated across the air interface via the antenna structure 926.

In various embodiments, the RF interface circuitry 908 may be configured to transmit/receive signals in a manner compatible with NR or other access technologies.

The antenna structure 926 may include antenna elements to convert electrical signals into radio waves to travel through the air and to convert received radio waves into electrical signals. The antenna elements may be arranged into one or more antenna panels. The antenna structure 926 may have antenna panels that are omnidirectional, directional, or a combination thereof to enable beamforming and multiple-input, multiple-output communications. The antenna structure 926 may include microstrip antennas, printed antennas fabricated on the surface of one or more printed circuit boards, patch antennas, phased array antennas, etc. The antenna structure 926 may have one or more panels designed for specific frequency bands including bands in FR1 or FR2.

The user interface 916 includes various input/output (I/O) devices designed to enable user interaction with the UE 900. The user interface 916 includes input device circuitry and output device circuitry. Input device circuitry includes any physical or virtual means for accepting an input including, inter alia, one or more physical or virtual buttons (for example, a reset button), a physical keyboard, keypad, mouse, touchpad, touchscreen, microphones, scanner, headset, or the like. The output device circuitry includes any physical or virtual means for showing information or otherwise conveying information, such as sensor readings, actuator position(s), or other like information. Output device circuitry may include any number or combinations of audio or visual display, including, inter alia, one or more simple visual outputs/indicators (for example, binary status indicators such as light emitting diodes "LEDs" and multi-character visual outputs, or more complex outputs such as display devices or touchscreens (for example, liquid crystal displays (LCDs), LED displays, quantum dot displays, projectors, etc.), with the output of characters, graphics, multimedia objects, and the like being generated or produced from the operation of the UE 900.

The sensors 920 may include devices, modules, or subsystems whose purpose is to detect events or changes in its environment and send the information (sensor data) about the detected events to some other device, module, subsystem, etc. Examples of such sensors include, inter alia, inertia measurement units comprising accelerometers, gyroscopes, or magnetometers; microelectromechanical systems or nanoelectromechanical systems comprising 3-axis accelerometers, 3-axis gyroscopes, or magnetometers; level sensors; flow sensors; temperature sensors (for example, thermistors); pressure sensors; barometric pressure sensors; gravimeters; altimeters; image capture devices (for example, cameras or lensless apertures); light detection and ranging sensors; proximity sensors (for example, infrared radiation detector and the like); depth sensors; ambient light sensors; ultrasonic transceivers; microphones or other like audio capture devices; etc.

The driver circuitry 922 may include software and hardware elements that operate to control particular devices that are embedded in the UE 900, attached to the UE 900, or otherwise communicatively coupled with the UE 900. The driver circuitry 922 may include individual drivers allowing other components to interact with or control various input/output (I/O) devices that may be present within, or connected to, the UE 900. For example, driver circuitry 922 may include a display driver to control and allow access to a display device, a touchscreen driver to control and allow access to a touchscreen interface, sensor drivers to obtain sensor readings of sensors 920 and control and allow access to sensors 920, drivers to obtain actuator positions of electro-mechanic components or control and allow access to the electro-mechanic components, a camera driver to control and allow access to an embedded image capture device, audio drivers to control and allow access to one or more audio devices.

The PMIC 924 may manage power provided to various components of the UE 900. In particular, with respect to the processors 904, the PMIC 924 may control power-source selection, voltage scaling, battery charging, or DC-to-DC conversion.

In some embodiments, the PMIC 924 may control, or otherwise be part of, various power saving mechanisms of the UE 900. For example, if the platform UE is in an RRC_Connected state, where it is still connected to the RAN node as it expects to receive traffic shortly, then it may enter a state known as Discontinuous Reception Mode (DRX) after a period of inactivity. During this state, the UE 900 may power down for brief intervals of time and thus save power. If there is no data traffic activity for an extended period of time, then the UE 900 may transition off to an RRC_Idle state, where it disconnects from the network and does not perform operations such as channel quality feedback, handover, etc. The UE 900 goes into a very low power state and it performs paging where again it periodically wakes up to listen to the network and then powers down again. The UE 900 may not receive data in this state; in order to receive data, it must transition back to RRC_Connected state. An additional power saving mode may allow a device to be unavailable to the network for periods longer than a paging interval (ranging from seconds to a few hours). During this time, the device is totally unreachable to the network and may power down completely. Any data sent during this time incurs a large delay and it is assumed the delay is acceptable.

A battery 928 may power the UE 900, although in some examples the UE 900 may be mounted deployed in a fixed location, and may have a power supply coupled to an electrical grid. The battery 928 may be a lithium ion battery, a metal-air battery, such as a zinc-air battery, an aluminum-air battery, a lithium-air battery, and the like. In some implementations, such as in vehicle-based applications, the battery 928 may be a typical lead-acid automotive battery.

Figure 10:
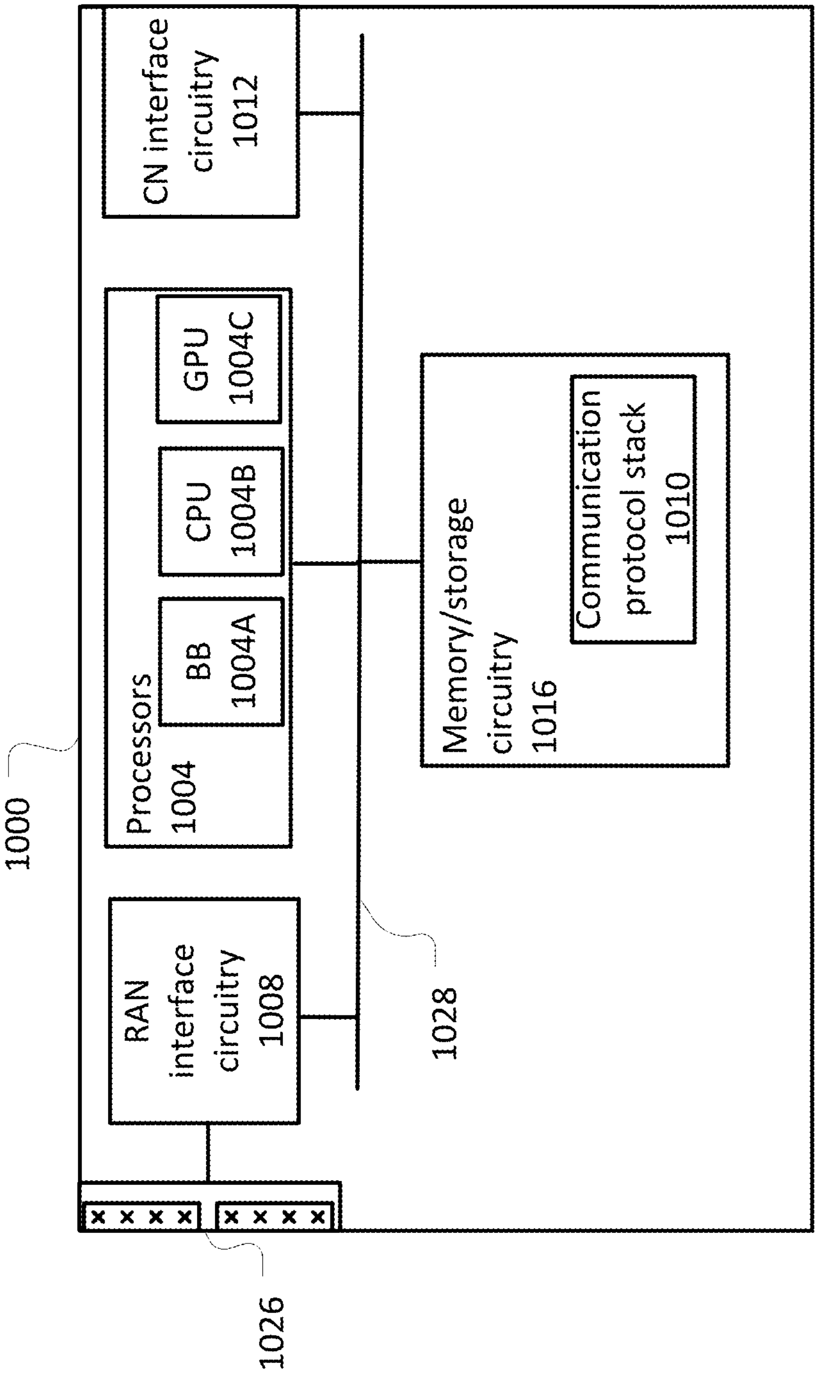
FIG. 10 illustrates a base station in accordance with some embodiments.

FIG. 10 illustrates an example base station 1000 in accordance with some embodiments. The base station 1000 may include processors 1004, RF interface circuitry 1008, core network (CN) interface circuitry 1012, memory/storage circuitry 1016, and antenna structure 1026.

The components of the base station 1000 may be coupled with various other components over one or more interconnects 1028.

The processors 1004, RF interface circuitry 1008, memory/storage circuitry 1016 (including communication protocol stack 1010), antenna structure 1026, and interconnects 1028 may be similar to like-named elements shown and described with respect to FIG. 9.

The CN interface circuitry 1012 may provide connectivity to a core network, for example, a $5^{th}$ Generation Core network (5GC) using a 5GC-compatible network interface protocol such as carrier Ethernet protocols, or some other suitable protocol. Network connectivity may be provided to/from the base station 1000 via a fiber optic or wireless backhaul. The CN interface circuitry 1012 may include one or more dedicated processors or FPGAs to communicate using one or more of the aforementioned protocols. In some implementations, the CN interface circuitry 1012 may include multiple controllers to provide connectivity to other networks using the same or different protocols.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

For one or more embodiments, at least one of the components set forth in one or more of the preceding figures may be configured to perform one or more operations, techniques, processes, or methods as set forth in the example section below. For example, the baseband circuitry as described above in connection with one or more of the preceding figures may be configured to operate in accordance with one or more of the examples set forth below. For another example, circuitry associated with a UE, base station, or network element as described above in connection with one or more of the preceding figures may be configured to operate in accordance with one or more of the examples set forth below in the example section.

EXAMPLES

In the following sections, further exemplary embodiments are provided.

Example 1 includes a method of operating a user equipment (UE), the method comprising: receiving, from a base station, an uplink (UL) configured grant (CG) configuration for simultaneous uplink transmissions across multiple panels (STxMP); receiving, from the base station, an indication of an STxMP scheme to be used with respect to the UL CG configuration, wherein the STxMP scheme is a frequency division multiplex (FDM)-A scheme, an FDM-B scheme, a spatial division multiplex (SDM) scheme, or a single-frequency network (SFN) scheme; and transmitting a physical uplink shared channel (PUSCH) transmission using at least two antenna panels of the UE based on the UL CG configuration and the STxMP scheme.

Example 2 includes a method of example 1 or some other example herein, further comprising: transmitting, to the base station, capabilities of the UE to support STxMP.

Example 3 includes a method of example 1 or some other example herein, wherein the uplink CG configuration is a type-1 UL CG configuration and the method further comprises: receiving a radio resource control (RRC) message that includes the UL CG configuration and the indication of the STxMP scheme.

Example 4 includes a method of example 1 or some other example herein, wherein the STxMP scheme is an FDM-A scheme or an FDM-B scheme and the UL CG configuration further includes a frequency domain resource allocation (FDRA) field to indicate a set of resources associated with a first antenna panel of the at least two antenna panels, and an offset to be used with respect to the first set of resources to identify a second set of resources associated with a second antenna panel of the at least two antenna panels.

Example 5 includes the method of example 1 or some other example herein, wherein the STxMP scheme is an FDM-A scheme or an FDM-B scheme and the UL CG configuration further includes a frequency domain resource allocation (FDRA) field to indicate a set of resources, wherein a first subset of the set of resources is associated with a first antenna panel of the at least two antenna panels and a second subset of the set of resources is associated with a second antenna panel of the at least two antenna panels.

Example 6 includes the method of example 1 or some other example herein, wherein the uplink CG configuration is a type-2 UL CG configuration and the method further comprises: receiving a radio resource control (RRC) message that includes the UL CG configuration; and receiving activation downlink control information (DCI) to trigger the PUSCH transmission, wherein the indication of the STxMP scheme is in the RRC message or the DCI.

Example 7 includes the method of example 1 or some other example herein, wherein the uplink CG configuration is a type-2 UL CG configuration and the method further comprises: receiving a radio resource control (RRC) message that includes the UL CG configuration and an indication of a plurality of STxMP schemes; and receiving activation downlink control information (DCI) to trigger the PUSCH transmission, wherein the activation DCI includes a selection of one of the plurality of STxMP schemes as the indication of the STxMP scheme to be used for the PUSCH transmission.

Example 8 includes a method of operating a user equipment (UE), the method comprising: receiving, from a base station, a first uplink (UL) configured grant (CG) configuration to schedule a first UL transmission and a second UL CG configuration to schedule a second UL transmission that overlaps with the first UL transmission in a time domain; detecting a condition; and determining the first and second UL transmissions are to be transmitted using a simultaneous uplink transmissions across multiple panels (STxMP) scheme based on the condition; simultaneously transmitting the first and second UL transmissions using at least two antenna panels of the UE based on the STxMP scheme.

Example 9 includes the method of example 8 or some other example herein, wherein detecting the condition comprises: determining the first UL CG configuration is associated with a first sounding reference signal (SRS) resource set and the second UL CG configuration is associated with a second SRS resource set.

Example 10 includes the method of example 8 or example 9 or some other example herein, wherein detecting the condition comprises: determining the first UL CG configuration and the second UL CG configuration are associated with different pool indexes.

Example 11 includes the method of example 10 or some other example herein, wherein the first and second UL CGs configurations are type-2 UL CG configurations and determining the first UL CG configuration and the second UL CG configuration are associated with different pool indexes comprises: detecting, in a first control resource set (CORESET), first activation DCI to trigger the first UL transmission, the first CORESET associated with a first pool index; and detecting, in a second control resource set (CORESET), second activation DCI to trigger the second UL transmission, the second CORESET associated with a second pool index.

Example 12 includes a method comprising: receiving, from a base station, an uplink (UL) configured grant (CG) configuration to schedule a first UL transmission; receiving, from the base station, scheduling downlink control information (DCI) to schedule a second UL transmission as a UL dynamic grant (DG); detecting a condition; determining the first and second UL transmissions are to be transmitted using a simultaneous uplink transmissions across multiple panels (STxMP) scheme based on the condition; and simultaneously transmitting the first and second UL transmissions using at least two antenna panels of the UE based on the STxMP scheme.

Example 13 includes the method of example 12 or some other example herein, wherein the first UL transmission is scheduled in a first resource and said detecting the condition comprises: determining that a time between receiving the scheduling DCI and the first resource is less than a predetermined threshold.

Example 14 includes the method of example 13 or some other example herein, wherein the UL CG configuration and the UL DG are associated with a first sounding reference signal (SRS) resource set associated with a first antenna panel of the at least two antenna panels, and the method further comprises: transmitting the first UL transmission using a second panel of the at least two antenna panels; and transmitting the second UL transmission using the first antenna panel of the at least two antenna panels.

Example 15 includes the method of example 12 or some other example herein, wherein said detecting the condition comprises: determining the first UL transmission is associated with a first priority; and determining the second UL transmission is associated with a second priority.

Example 16 includes the method of example 12 or some other example herein, wherein said detecting the condition comprises: determining the UL CG configuration and the UL DG are associated with different sounding reference signal (SRS) resource sets.

Example 17 includes the method of example 16 or some other example herein, wherein the UL CG configuration is a type-1 CG received in a radio resource control (RRC) signal and said determining the UL CG configuration and the UL DG are associated with different SRS resource sets comprises: detecting a first SRS resource set indicator in the scheduling DCI; and detecting a second SRS resource set indicator in the RRC signal.

Example 18 includes the method of example 16 or some other example herein, wherein the UL CG configuration is a type-2 CG and said determining the UL CG configuration and the UL DG are associated with different SRS resource sets comprises: detecting a first SRS resource set indicator in the scheduling DCI; and detecting a second SRS resource set indicator in an activation DCI of the type-2 CG.

Example 19 includes the method of example 12 or some other example herein, wherein the UL CG configuration is a type-2 CG and said detecting the condition comprises: detecting activation DCI of the type-2 CG in a first control resource set (CORESET) associated with a first pool index; and detecting the scheduling DCI in a second CORESET associated with a second pool index.

Example 20 includes a method of operating a base station, the method comprising: receiving, from a user equipment (UE), a capability report to indicate the UE supports simultaneous transmissions across multiple panels (STxMP) for multiple configured grant (CG) transmissions from a single CG configuration, multiple CG transmissions from different CG configurations; or a CG transmission and a dynamic grant transmission; providing, to the UE, configuration and scheduling information to schedule a STxMP based on the capability report.

Example 21 includes a method of example 20 or some other example herein, wherein the capability report further indicates whether the UE supports STxMP for multiple transmissions having fully aligned symbols or partially aligned symbols.

Example 22 includes the method of example 20 or some other example herein, wherein the capability report further indicates whether the UE supports STxMP for multiple transmissions having non-aligned, partially-aligned, or fully aligned demodulation reference signal (DMRS) symbol locations and types.

Example 23 includes the method of example 20 or some other example herein, wherein the capability report further indicates whether the UE supports STxMP for multiple transmissions having demodulation reference signal (DMRS) ports belonging to a same code-division multiplexing (CDM) group or to orthogonal CDM groups.

Example 24 includes a method of operating a base station, the method comprising: transmitting, to a user equipment (UE), an uplink (UL) configured grant (CG) configuration to schedule a first UL transmission associated with a first antenna panel of the UE; transmitting, to the UE, scheduling downlink control information (DCI) to schedule a second UL transmission as a UL dynamic grant (DG) associated with a second antenna panel of the UE; and receiving, from the UE, the first and second UL transmissions based on a simultaneous uplink transmission across multiple panels (STxMP) scheme.

Example 25 includes the method of example 24 some other example herein, wherein the first UL transmission is scheduled in a first resource and the scheduling DCI is transmitted less than a predetermined period of time from the first resource.

Example 26 includes the method of example 25 or some other example herein, wherein the base station is to ensure that the first and second UL transmissions are associated with different antenna panels based on the scheduling DCI being transmitted less than a predetermined period of time from the first resource. Example 27 may include an apparatus comprising means to perform one or more elements of a method described in or related to any of examples 1-26, or any other method or process described herein.

Example 28 may include one or more non-transitory computer-readable media comprising instructions to cause an electronic device, upon execution of the instructions by one or more processors of the electronic device, to perform one or more elements of a method described in or related to any of examples 1-26, or any other method or process described herein.

Example 29 may include an apparatus comprising logic, modules, or circuitry to perform one or more elements of a method described in or related to any of examples 1-26, or any other method or process described herein.

Example 30 may include a method, technique, or process as described in or related to any of examples 1-26, or portions or parts thereof.

Example 31 may include an apparatus comprising: one or more processors and one or more computer-readable media comprising instructions that, when executed by the one or more processors, cause the one or more processors to perform the method, techniques, or process as described in or related to any of examples 1-26, or portions thereof.

Example 32 may include a signal as described in or related to any of examples 1-26, or portions or parts thereof.

Example 33 may include a datagram, information element, packet, frame, segment, PDU, or message as described in or related to any of examples 1-26, or portions or parts thereof, or otherwise described in the present disclosure.

Example 34 may include a signal encoded with data as described in or related to any of examples 1-26, or portions or parts thereof, or otherwise described in the present disclosure.

Example 35 may include a signal encoded with a datagram, TE, packet, frame, segment, PDU, or message as described in or related to any of examples 1-26, or portions or parts thereof, or otherwise described in the present disclosure.

Example 36 may include an electromagnetic signal carrying computer-readable instructions, wherein execution of the computer-readable instructions by one or more processors is to cause the one or more processors to perform the method, techniques, or process as described in or related to any of examples 1-26, or portions thereof.

Example 37 may include a computer program comprising instructions, wherein execution of the program by a processing element is to cause the processing element to carry out the method, techniques, or process as described in or related to any of examples 1-26, or portions thereof.

Example 38 may include a signal in a wireless network as shown and described herein.

Example 39 may include a method of communicating in a wireless network as shown and described herein.

Example 40 may include a system for providing wireless communication as shown and described herein.

Example 41 may include a device for providing wireless communication as shown and described herein.

Any of the above-described examples may be combined with any other example (or combination of examples), unless explicitly stated otherwise. The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. An apparatus comprising:

interface circuitry; and processing circuitry coupled with the interface circuitry, the processing circuitry to:

receive, from a base station via the interface circuitry, a first uplink (UL) configured grant (CG) configuration associated with a first UL transmission and a second UL CG configuration associated with a second UL transmission that overlaps with the first UL transmission in a time domain;

receive a radio resource control (RRC) parameter to indicate a simultaneous uplink transmissions across multiple panels (STxMP) scheme;

detect a condition that is based on the first UL CG configuration and the second UL CG configuration being associated with different sounding reference signal (SRS) resource sets or pool indexes;

determine, based on the condition and the RRC parameter, the first and second UL transmissions are to be transmitted using the STxMP scheme; and output, via the interface circuitry, the first and second UL transmissions for simultaneous transmission using at least two antenna panels of a user equipment (UE) based on the STxMP scheme.

2. The apparatus of claim 1, wherein to detect the condition the processing circuitry is to:

determine the first UL CG configuration is associated with a first SRS resource set and the second UL CG configuration is associated with a second SRS resource set.

3. The apparatus of claim 1, wherein to detect the condition the processing circuitry is to:

determine the first UL CG configuration and the second UL CG configuration are associated with different pool indexes.

4. The apparatus of claim 3, wherein the processing circuitry is further to:

receive a first RRC parameter to indicate the first UL CG configuration is associated with a first pool index;

receive a second RRC parameter to indicate the second UL CG configuration is associated with a second pool index; and determine the first UL CG configuration and the second UL CG configuration are associated with different pool indexes based on the first and second RRC parameters.

5. The apparatus of claim 4, wherein the first and second UL CG configurations are type-1 UL CG configurations.

6. The apparatus of claim 1, wherein the first and second UL CG configurations are type-2 UL CG configurations and to detect the condition the processing circuitry is to:

detect, in a first control resource set (CORESET), first activation downlink control information (DCI) to trigger the first UL transmission, the first CORESET associated with a first SRS resource set indicator; and detect, in a second control resource set (CORESET), second activation DCI to trigger the second UL transmission, the second CORESET associated with a second SRS resource set indicator.

7. A method comprising:

receiving, from a base station, a first uplink (UL) configured grant (CG) configuration associated with a first uplink (UL) transmission and a second UL CG configuration associated with a second UL transmission that overlaps with the first UL transmission in a time domain;

receiving a radio resource control (RRC) parameter to indicate a simultaneous uplink transmissions across multiple panels (STxMP) scheme;

detecting a condition that is based on the first UL CG configuration and the second UL CG configuration being associated with different sounding reference signal (SRS) resource sets or pool indexes;

determining, based on receiving the RRC parameter and detecting the condition, the first and second UL transmissions are to be transmitted using the STxMP scheme; and outputting the first and second UL transmissions for simultaneous transmission using at least two antenna panels based on the STxMP scheme.

8. The method of claim 7, wherein detecting the condition comprises:

determining the first UL CG configuration is associated with a first SRS resource set and the second UL CG configuration is associated with a second SRS resource set.

9. The method of claim 7, wherein detecting the condition comprises:

determining the first UL CG configuration and the second UL CG configuration are associated with different pool indexes.

10. The method of claim 9, further comprising:

receiving at least one RRC parameter; and determining the first UL CG configuration and the second UL CG configuration are associated with different pool indexes based on the at least one RRC parameter.

11. The method of claim 10, wherein the at least one RRC parameter includes:

a first RRC parameter to indicate the first UL CG configuration is associated with a first pool index; and a second RRC parameter to indicate the second UL CG configuration is associated with a second pool index.

12. The method of claim 11, wherein the first and second UL CG configurations are type-1 UL CG configurations.

13. The method of claim 7, wherein the first and second UL CG configurations are type-2 UL CG configurations and detecting the condition comprises:

detecting, in a first control resource set (CORESET), first activation downlink control information (DCI) to trigger the first UL transmission, the first CORESET associated with a first sounding reference signal (SRS) resource set indicator; and detecting, in a second control resource set (CORESET), second activation DCI to trigger the second UL transmission, the second CORESET associated with a second SRS resource set indicator.

14. A method comprising:

generating, for transmission to a user equipment (UE), a first type 1 or type 2 configured grant (CG) configuration associated with a first uplink (UL) transmission and a second type 1 or type 2 CG configuration associated with a second UL transmission that overlaps with the first UL transmission in a time domain, wherein the first type 1 or type 2 CG configuration and the second type 1 or type 2 CG configuration are associated with different sounding reference signal (SRS) resource sets or pool indexes;

generating, for transmission to the UE, a radio resource control (RRC) parameter to indicate a simultaneous uplink transmissions across multiple panels (STxMP) scheme, wherein the RRC parameter and the first type 1 or type 2 CG configuration and the second type 1 or type 2 CG configuration being associated with different SRS resource sets or pool indexes are to serve as a basis for the UE to transmit the first and second UL transmissions as simultaneous transmissions from at least two antenna panels of the UE based on the STxMP scheme; and receiving the first and second UL transmissions from the UE.

15. The method of claim 14, wherein the first UL CG configuration is associated with a first SRS resource set and the second UL CG configuration is associated with a second SRS resource set.

16. The method of claim 14, wherein the first UL CG configuration and the second UL CG configuration are associated with different pool indexes.

17. The method of claim 16, further comprising:

outputting, for transmission to the UE, at least one radio resource control (RRC) parameter to indicate the first UL CG configuration and the second UL CG configuration are associated with different pool indexes.

18. The method of claim 17, wherein the at least one RRC parameter includes:

a first RRC parameter to indicate the first UL CG configuration is associated with a first pool index; and a second RRC parameter to indicate the second UL CG configuration is associated with a second pool index.

19. The method of claim 18, wherein the first and second UL CG configurations are type-1 UL CG configurations.

20. The method of claim 14, wherein the first and second UL CGs configurations are type-2 UL CG configurations and:

a first activation downlink control information (DCI), in a first control resource set (CORESET), triggers the first UL transmission, the first CORESET associated with a first sounding reference signal (SRS) resource set indicator; and a second activation DCI, in a second control resource set (CORESET), triggers the second UL transmission, the second CORESET associated with a second SRS resource set indicator.

* * * * *